United States Patent
Kawai et al.

(10) Patent No.: US 10,827,075 B2
(45) Date of Patent: Nov. 3, 2020

(54) ECHO REDUCER, VOICE COMMUNICATION DEVICE, METHOD FOR REDUCING ECHO, AND RECORDING MEDIUM

(71) Applicant: Yamaha Corporation, Hamamatsu-shi, Shizuoka-Ken (JP)

(72) Inventors: Tetsuto Kawai, Hamamatsu (JP); Satoshi Ukai, Hamamatsu (JP); Yoshifumi Oizumi, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 77 days.

(21) Appl. No.: 16/044,831

(22) Filed: Jul. 25, 2018

(65) Prior Publication Data
US 2018/0332174 A1    Nov. 15, 2018

Related U.S. Application Data

(63) Continuation of application No. PCT/JP2017/009178, filed on Mar. 8, 2017.

(30) Foreign Application Priority Data

Mar. 9, 2016 (JP) .............................. 2016-045128

(51) Int. Cl.
*H04M 9/08* (2006.01)
*H04B 3/23* (2006.01)
(Continued)

(52) U.S. Cl.
CPC ................ *H04M 9/08* (2013.01); *H04B 3/23* (2013.01); *H04R 1/2869* (2013.01); *H04R 3/02* (2013.01)

(58) Field of Classification Search
CPC .......... H04M 9/08; H04B 3/23; H04R 1/2869
(Continued)

(56) References Cited

U.S. PATENT DOCUMENTS

| 2007/0140469 | A1* | 6/2007 | Larzabal | H04M 1/738 379/345 |
| 2007/0288236 | A1* | 12/2007 | Kim | G10L 25/93 704/231 |
| 2015/0078549 | A1 | 3/2015 | Frauenthal et al. | |

FOREIGN PATENT DOCUMENTS

| JP | 7-226697 A | 8/1995 |
| JP | 2015-19185 A | 1/2015 |

OTHER PUBLICATIONS

International Search Report (PCT/ISA/210) issued in PCT Application No. PCT/JP2017/009178 dated Jun. 6, 2017 with English translation (five pages).

(Continued)

Primary Examiner — Md S Elahee
(74) Attorney, Agent, or Firm — Crowell & Moring LLP

(57) ABSTRACT

An echo reducer includes: an obtainer configured to obtain frequency characteristics of a transmission system from a sound emitter of a sound emission and collection device to a sound collector of the sound emission and collection device; a determiner configured to determine whether or not both a transmission signal and a reception signal in the sound emission and collection device are in a state of including a sound; and an attenuator configured to attenuate the reception signal to be output to the sound emitter, by attenuation characteristics corresponding to the frequency characteristics of the transmission system that the obtainer obtains, when the determiner determines that both the transmission signal and the reception signal in the sound emission and collection device include a sound.

19 Claims, 9 Drawing Sheets

(51) Int. Cl.
*H04R 1/28* (2006.01)
*H04R 3/02* (2006.01)
(58) Field of Classification Search
USPC ................ 379/406.01–406.06, 345; 704/231
See application file for complete search history.

(56) References Cited

OTHER PUBLICATIONS

Japanese-language Written Opinion (PCT/ISA/237) issued in PCT Application No. PCT/JP2017/009178 dated Jun. 6, 2017 (four pages).

* cited by examiner

ECHO REDUCER, VOICE COMMUNICATION DEVICE, METHOD FOR REDUCING ECHO, AND RECORDING MEDIUM

CROSS REFERENCE TO RELATED APPLICATIONS

The present application is a continuation application of International Patent Application No. PCT/JP2017/009178, filed on Mar. 8, 2017, which claims priority to Japanese Patent Application No. 2016-045128, filed on Mar. 9, 2016. The contents of these applications are incorporated herein by reference in their entirety.

BACKGROUND OF THE INVENTION

1. Field of the Invention

The present invention relates to a technology for reducing an echo when both a transmission signal and a reception signal include a sound in a sound emission and collection device including a sound emitter and a sound collector, the sound emitter emitting a sound, based on the reception signal, the sound collector generating the transmission signal.

2. Description of the Related Art

Conventionally, as such a sound emission and collection device including a sound emitter and a sound collector, a voice communication device has been known (Japanese Unexamined Patent Application Publication No. H07-226697, for example). The voice communication device disclosed in Japanese Unexamined Patent Application Publication No. H07-226697 transmits a transmission signal generated by collecting a sound to a different voice communication device. The different voice communication device receives the transmission signal as a reception signal. The sound emitter of the different voice communication device emits the reception signal. In this manner, the two voice communication devices disclosed in Japanese Unexamined Patent Application Publication No. H07-226697 perform bidirectional communication of voice.

The voice communication device disclosed in Japanese Unexamined Patent Application Publication No. H07-226697 is provided with a loss controller in order to prevent an echo. The loss controller attenuates a reception signal uniformly regardless of frequency.

When both a transmission signal and a reception signal include a sound in the voice communication device disclosed in Japanese Unexamined Patent Application Publication No. H07-226697, an echo may occur. In such a case, the echo is a sound that a first voice communication device transmits, for example, and is a sound that diffracts from the sound emitter of a second voice communication device to the sound collector of the second voice communication device. Afterward, a diffracted sound (an echo) returns to the first voice communication device.

However, since a loss controller lowers the level of the reception signal uniformly regardless of frequency in the voice communication device disclosed in Japanese Unexamined Patent Application Publication No. H07-226697 may be unable to appropriately reduce the echo in such a case.

SUMMARY OF THE INVENTION

In view of the foregoing, preferred embodiments of the present invention provide an echo reducer, a voice communication device, a method for reducing an echo, and a recording medium that are able to appropriately reduce an echo when both a transmission signal and a reception signal include a sound in a sound emission and collection device.

An echo reducer according to a preferred embodiment of the present invention includes: an obtainer configured to obtain frequency characteristics of a transmission system from a sound emitter of a sound emission and collection device to a sound collector of the sound emission and collection device; a determiner configured to determine whether or not both a transmission signal and a reception signal in the sound emission and collection device are in a state of including a sound; and an attenuator configured to attenuate the reception signal to be output to the sound emitter by attenuation characteristics corresponding to the frequency characteristics of the transmission system that the obtainer obtains, when the determiner determines that both the transmission signal and the reception signal in the sound emission and collection device include a sound.

The above and other elements, features, characteristics, and advantages of the present invention will become more apparent from the following detailed description of the preferred embodiments with reference to the attached drawings.

DETAILED DESCRIPTION OF THE PREFERRED EMBODIMENTS

Figure 1:
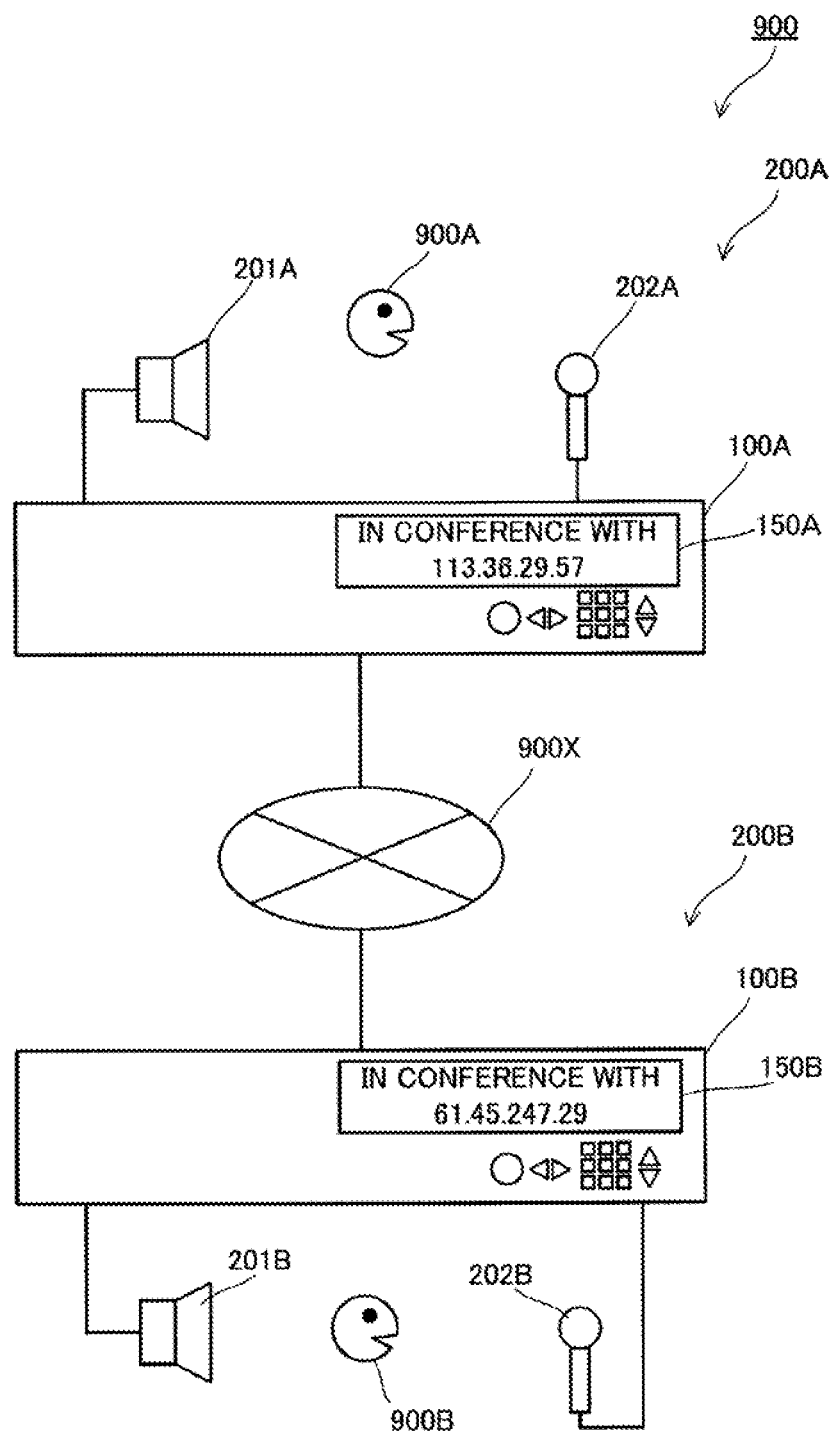
FIG. 1 is a diagram showing a concept of an audio conference system provided with an audio conference device according to a first preferred embodiment of the present invention.
Figure 2:
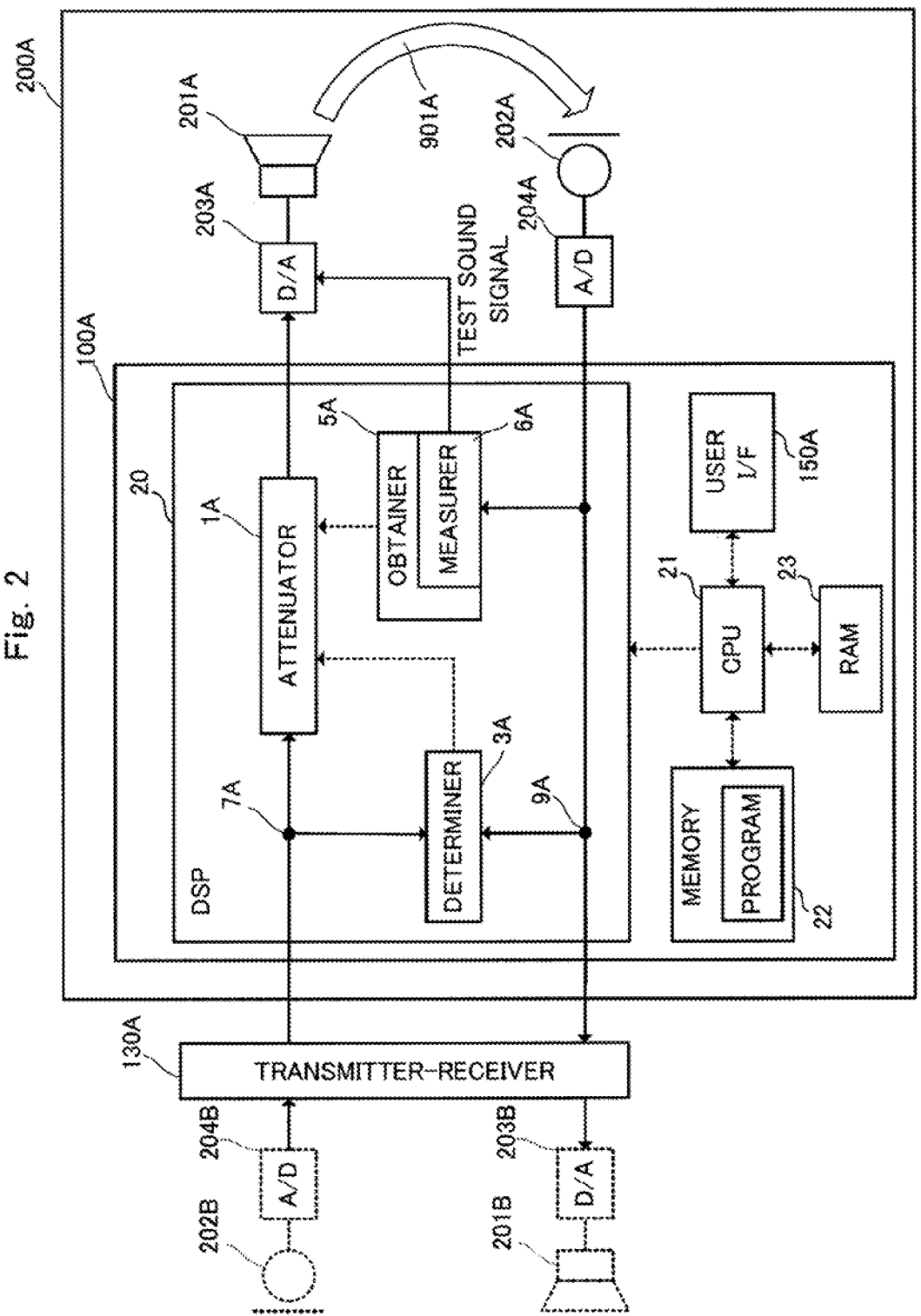
FIG. 2 is a block diagram showing a portion of a configuration of the audio conference device.

A description will be made of an audio conference device 200A and an audio conference device 200B according to a first preferred embodiment of the present invention with reference to FIG. 1 and FIG. 2. FIG. 1 is a diagram showing a concept of an audio conference system 900 provided with the audio conference device 200A and the audio conference device 200B. FIG. 2 is a block diagram showing a portion of a configuration of the audio conference device 200A. It is to be noted that, in FIG. 2, a solid line shows the flow of a sound signal and a dotted line shows the flow of information. In addition, since the configuration of the audio conference device 200B is the same as the configuration of the audio conference device 200A, a description of a portion of the configuration of the audio conference device 200B will be omitted.

As shown in FIG. 1, the audio conference system 900 is provided with two sets of audio conference devices: the audio conference device 200A and the audio conference device 200B. The audio conference device 200A and the audio conference device 200B are installed in conference rooms that are different from each other. A network 900X mutually connects the audio conference device 200A and the audio conference device 200B through the network 900X.

As shown in FIG. 1, the audio conference device 200A is provided with an echo reducer 100A, a speaker 201A, and a microphone 202A. The audio conference device 200B is provided with an echo reducer 100B, a speaker 201B, and a microphone 202B. The audio conference device 200A collects a sound a talker 900A has uttered, by the microphone 202A. The audio conference device 200A transmits collected sound to the audio conference device 200B. The audio conference device 200A, when receiving the sound (the sound that the talker 900B has uttered) that has been received from the audio conference device 200B, emits the sound from the speaker 201A. It is to be noted that the speaker 201A and the speaker 201B are examples of the "sound emitter" according to the present invention. In addition, the microphone 202A and the microphone 202B are examples of the "sound collector" according to the present invention.

The audio conference device 200A and the audio conference device 200B according to the first preferred embodiment of the present invention reduce an echo during double talk. The double talk means that a talker 900A and a talker 900B simultaneously utter a sound to each other in the audio conference device 200A and the audio conference device 200B. In other words, the audio conference device 200A and the audio conference device 200B simultaneously transmit a sound to each other during double talk. The double talk is an example in a state in which both a transmission signal that the audio conference device 200A transmits to the audio conference device 200B, and a reception signal that the audio conference device 200A receives from the audio conference device 200B include a sound, for example. The state of including a sound indicates a state in which a sound is determined to be present in both the audio conference device 200A and the audio conference device 200B. The determination of presence or absence of a sound depends on the level of a sound, for example, and, if each of the levels of a digital audio signal of a sound is greater than or equal to a predetermined value (54 dB, for example), the determination that a sound is present is made. It is to be noted that the audio conference device 200A transmits to the audio conference device 200B according to the first preferred embodiment of the present invention are able to be utilized not only during double talk but also when both a transmission signal that the audio conference device 200A transmits to the audio conference device 200B and a reception signal that the audio conference device 200A receives from the audio conference device 200B include a sound. For example, even when the talker 900A and the talker 900B do not simultaneously utter a sound, it is sufficient that both the audio conference device 200A and the audio conference device 200B may be in a state in which a sound is determined to be simultaneously present.

In the first preferred embodiment of the present invention, an echo during double talk includes a sound that returns to the audio conference device 200B by emitting the sound from the speaker 201A of the audio conference device 200A and then collecting the sound by the microphone 202A, among the sounds that the talker 900B on the side of the audio conference device 200B utters during double talk. Similarly, the echo during double talk also includes a sound that returns to the audio conference device 200A by emitting the sound from the speaker 201B of the audio conference device 200B and then collecting the sound by the microphone 202B, among the sounds that the talker 900A on the side of the audio conference device 200A utters during double talk.

As shown in FIG. 2, the audio conference device 200A is provided with a digital-to-analog converter 203A (that is shown as D/A 203A in FIG. 2), and an analog-to-digital converter 204A (that is shown as A/D 204A in FIG. 2). The echo reducer 100A outputs a digital signal, and inputs the digital signal to the digital-to-analog converter 203A. The digital-to-analog converter 203A converts the input digital audio signal into an analog audio signal. The speaker 201A emits a sound, based on the analog audio signal that the digital-to-analog converter 203A outputs. The analog-to-digital converter 204A is connected to the microphone 202A. The microphone 202A generates an analog audio signal by collecting a sound. The analog-to-digital converter 204A converts the analog audio signal generated by the microphone 202A into a digital audio signal. The analog-to-digital converter 204A outputs the converted digital audio signal to the echo reducer 100A.

As shown in FIG. 2, the audio conference device 200A is provided with a transmitter-receiver 130A. The transmitter-receiver 130A has a LAN interface connected to the network 900X, for example. The transmitter-receiver 130A performs transmission and reception of a digital audio signal and a variety of information to the audio conference device 200B.

As shown in FIG. 2, the echo reducer 100A is provided with a DSP (Digital Signal Processor) 20, a CPU 21, a memory 22, a RAM 23, and a user interface (I/F) 150A. The CPU 21 is connected to the DSP 20, the memory 22, the RAM 23, and the user interface 150A. The DSP 20 is provided with an attenuator 1A, a determiner 3A, an obtainer 5A, a brancher 7A, and a brancher 9A. The CPU 21 receives an operation and the like through the user interface 150A. The memory 22 stores a program for operating the CPU 21, a parameter for operating the DSP 20, or the like. The CPU 21 reads the program stored in the memory 22 out to the RAM 23 and achieves a predetermined function. The DSP 20 performs signal processing to a sound signal to be input through the transmitter-receiver 130A. The CPU 21 reads the parameter stored in the memory 22 and sets the parameter to the DSP 20. The DSP 20 functionally configures the attenuator 1A, the determiner 3A, and the obtainer 5A by the parameter set by the CPU 21. However, the attenuator 2A, the determiner 3A, and the obtainer 5A may be implemented by executing the program stored in the memory 22, by the CPU 21. It is to be noted that the user interface 150A and a user interface 150B are examples of the "receiver" according to the present invention. The receiver may be implemented by executing the program stored in the memory 22, by the CPU 21.

The microphone 202B of the audio conference device 200B generates an analog audio signal by collecting a sound. An analog-to-digital converter 204B converts the analog audio signal generated by the microphone 202B into a digital audio signal. The analog-to-digital converter 204B inputs the converted digital audio signal to the brancher 7A through the transmitter-receiver 130A. The brancher 7A branches the input digital audio signal, and outputs the digital audio signal to the attenuator 1A and the determiner 3A. The attenuator 1A is made of a filter having predetermined attenuation characteristics. The attenuator 1A attenuates the digital audio signal by the predetermined attenuation characteristics. Afterward, the attenuator 1A outputs the attenuated digital audio signal to the digital-to-analog converter 203A.

The analog-to-digital converter 204A outputs a digital audio signal and inputs the digital audio signal to the brancher 9A. The brancher 9A branches the input digital audio signal, and outputs the digital audio signal to the transmitter-receiver 130A and the determiner 3A. In other words, the digital audio signal of the sound that has been collected by the microphone 202A and the microphone 202B is input to the determiner 3A.

The determiner 3A determines that double talk has occurred in the audio conference system 900 if each of the levels of the two input digital audio signals is greater than or equal to a predetermined threshold value (54 dB, for example). The determiner 3A outputs the information on a determination result to the attenuator 1A, as shown in FIG. 2. However, the determiner 3A may use not only dB but also mV as a unit of the level of the two digital audio signals.

The obtainer 5A obtains frequency characteristics 901A of a transmission system from the speaker 201A to the microphone 202A. The obtainer 5A includes a measurer 6A that measures the frequency characteristics 901A of the transmission system. The measurer 6A outputs the information on the frequency characteristics 901A of the transmission system obtained by calculation to the attenuator 1A.

Hereinafter, the sound signal that the audio conference device 200A receives from the audio conference device 200B is referred to as a reception signal, and the sound signal that the audio conference device 200A transmits to the audio conference device 200B is referred to as a transmission signal while the description is made.

Figure 3:
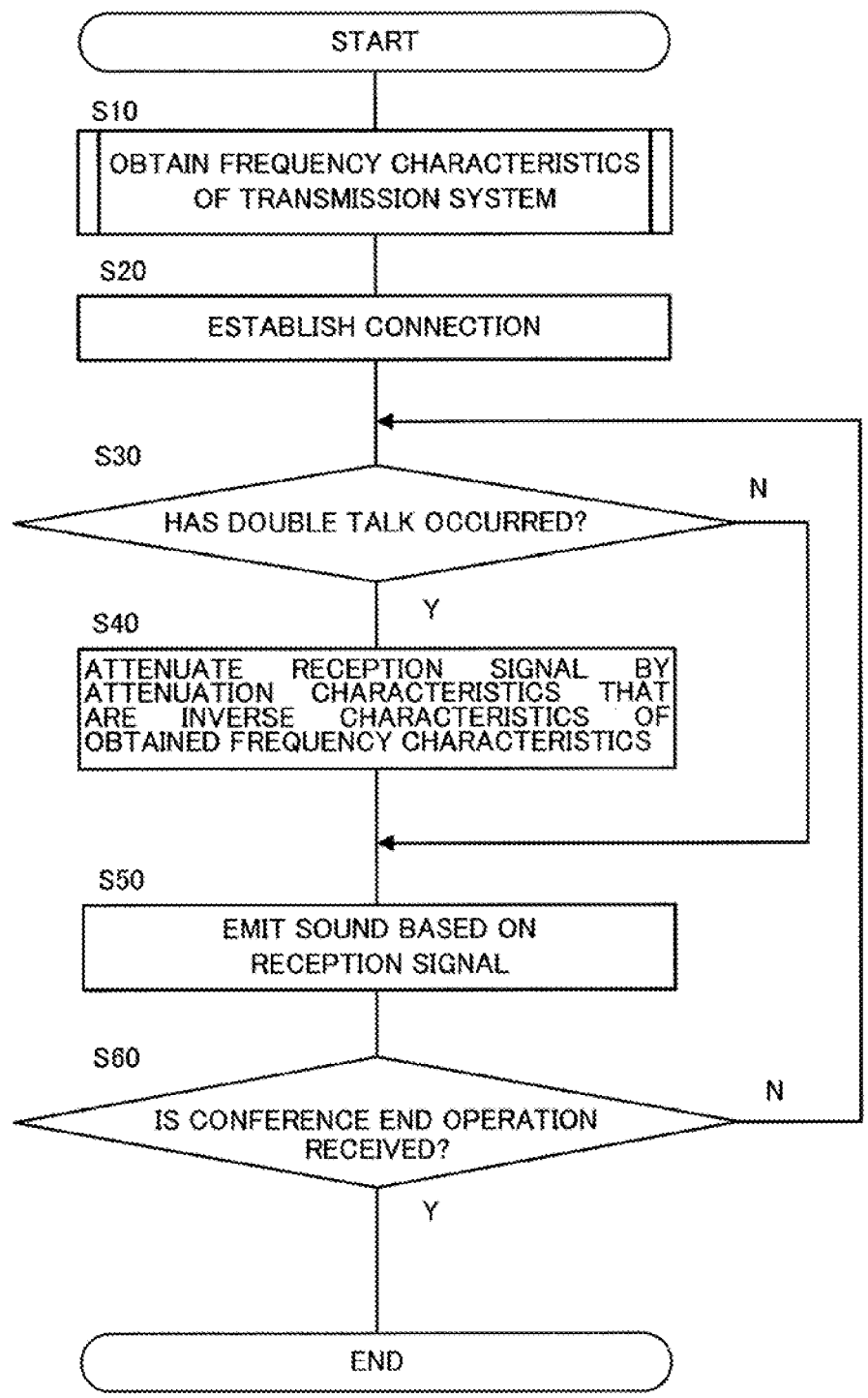
FIG. 3 is a flow chart showing an operation of the audio conference device.
Figure 4A:
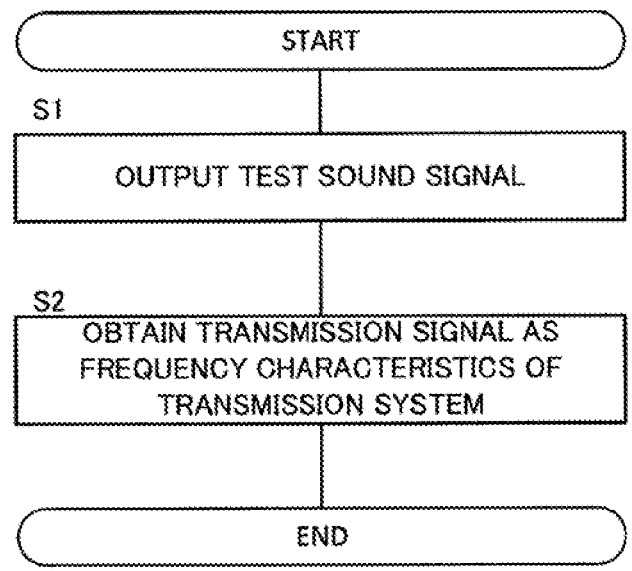
FIG. 4A is a flow chart of a subprocess of the audio conference device.

FIG. 3 is a flow chart showing an operation of the audio conference device 200A. FIG. 4A is a flow chart of Step S10 shown in FIG. 3.

As shown in FIG. 3, the obtainer 5A obtains the frequency characteristics 901A of the transmission system (S10). Specifically, as shown in FIG. 4A, the measurer 6A of the obtainer 5A outputs a test sound signal (S1). Examples of the test sound include white noise. The digital-to-analog converter 203A converts the test sound signal into an analog audio signal. Then, the speaker 201A emits the white noise. The microphone 202A collects the emitted white noise. The frequency characteristics of the collected white noise change with the frequency characteristics 901A of the transmission system.

Subsequently, the measurer 6A obtains the digital audio signal that has been output from the analog-to-digital converter 204A (S2). The measurer 6A performs a frequency analysis of the obtained digital audio signal by conventional technology such as a Fourier transformation. As a result, the measurer 6A calculates the frequency characteristics 901A of the transmission system. The obtainer 5A obtains the frequency characteristics 901A of the transmission system that have been calculated by the measurer 6A.

Returning to FIG. 3, the audio conference device 200A, after finishing obtaining the frequency characteristics 901A of the transmission system (S10), establishes connection with the audio conference device 200B (S20). For example, the audio conference device 200A, when receiving a connection setting operation from the talker 900A through the user interface 150A, establishes connection while the audio conference device 200B, when receiving a connection setting operation from the talker 900B through the user interface 150B, establishes connection. As a result, the audio conference system 900 starts an audio conference in which the bidirectional communication of voice between the audio conference device 200A and the audio conference device 200B is performed.

Subsequently, the determiner 3A determines whether or not double talk has occurred (S30). When the determiner 3A determines that the double talk has occurred (S30: Y), the attenuator 1A attenuates a reception signal by predetermined attenuation characteristics (S40). In the first preferred embodiment, the attenuator 1A sets the attenuation characteristics so as to become inverse characteristics of the frequency characteristics 901A of the transmission system that the obtainer 5A has obtained.

Then, the speaker 201A emits a sound, based on the attenuated reception signal (S50). The audio conference device 200A returns to Step S30 if the audio conference does not end (S60: N). The audio conference device 200A ends the process if the audio conference has ended (S60: Y). For example, the audio conference device 200A, when receiving an end operation from the talker 900A through the user interface 150A, determines that the audio conference has ended.

The audio conference device 200A, when the determiner 3A determines that the double talk has not occurred (S30: N), proceeds to Step 50. In other words, the speaker 201A, when the double talk has not occurred, emits a sound based on a reception signal that is not attenuated by the attenuator 1A.

Figure 4B:
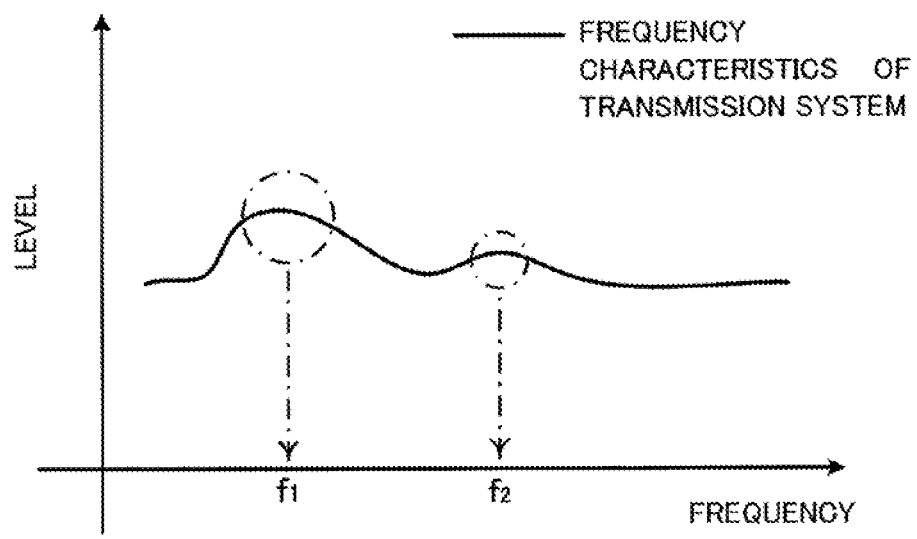
FIG. 4B shows frequency characteristics of a transmission system from a speaker to a microphone.

In the first preferred embodiment, a description will be made of attenuation of a reception signal with reference to FIG. 4B. FIG. 4B shows the frequency characteristics 901A of the transmission system from the speaker 201A to the microphone 202A. However, the frequency characteristics 901A shown in FIG. 4A are measured by emitting white noise as a test sound.

As shown in FIG. 4B, the frequency characteristics 901A of the transmission system has a peak in frequency $f_1$ and frequency $f_2$. The peaks show an echo that diffracts from the speaker 201A to the microphone 202A, among the emitted white noise.

Then, the attenuator 1A attenuates reception signals by the attenuation characteristics that are inverse characteristics of the obtained frequency characteristics 901A of the transmission system. In such a case, among the reception signals, the level of only the frequency $f_1$ and the frequency $f_2$ that are likely to become an echo decreases. As a result, among the sound that the audio conference device 200B transmits, only an echo that diffracts from the speaker 201A to the microphone 202A is difficult to occur.

As described above, the audio conference device 200A according to the first preferred embodiment, since emitting a sound based on the reception signal of which the level of only the frequency $f_1$ and the frequency $f_2$ that are likely to become an echo during double talk, is able to appropriately reduce only the echo during double talk. In other words, the audio conference device 200A is able to prevent an echo during double talk from remaining, even when the amount to be uniformly attenuated is small regardless of frequency. In addition, the audio conference device 200A is able to prevent the voice of the talker 900B from getting too small to be heard, even when the amount to foe uniformly attenuated is large regardless of frequency.

In addition, the audio conference device 200A according to the first preferred embodiment, since emitting a sound without attenuating a reception signal during single talk, is able to maintain the reception signal without changing the reception signal when only the talker 900B talks.

It is to be noted that, while the above example shows the audio conference device 200A and the audio conference device 200B as a voice communication device according to a preferred embodiment of the present invention, the voice communication device according to a preferred embodiment of the present invention may be able to perform bidirectional communication of voice. Therefore, the voice communication device according to a preferred embodiment of the present invention is not limited to an audio conference device. For example, the voice communication device according to a preferred embodiment of the present invention may be a telephone (including a mobile phone), a smartphone, and a tablet terminal. In addition, the voice communication device according to a preferred embodiment of the present invention is not limited to hardware but may be implemented by execution of a program (an application program of a smartphone, for example). It is to be noted that the voice communication device according to a preferred embodiment of the present invention may cause a computer to execute a program by reading the program from a computer-readable medium in which the program is stored.

Figure 5A:
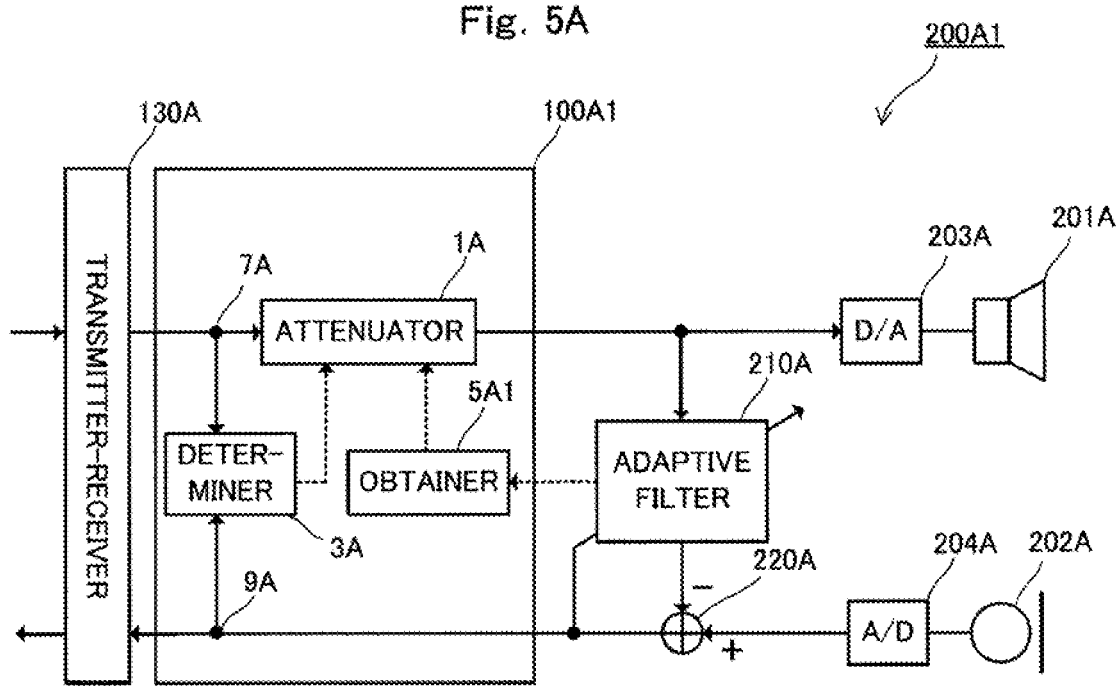
FIG. 5A is a block diagram showing a portion of a configuration of an audio conference device according to a second preferred embodiment of the present invention.
Figure 5B:
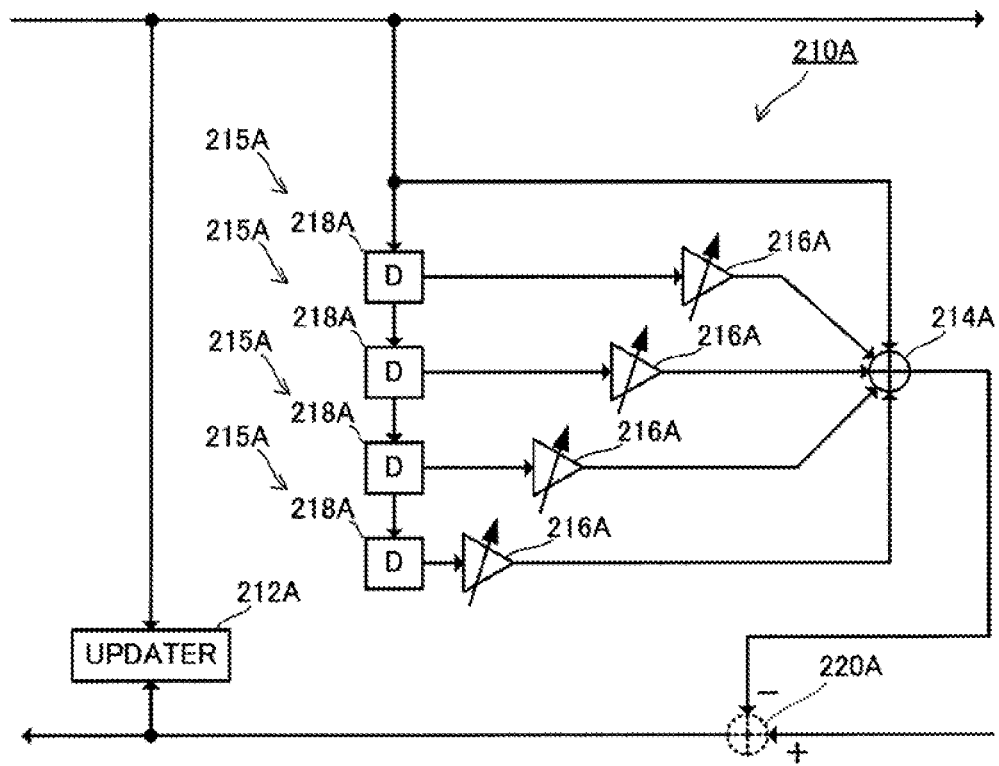
FIG. 5B is a block diagram of an adaptive filter.

Subsequently, a description will be made of an audio conference device 200A1 according to a second preferred embodiment of the present invention with reference to FIG. 5A and FIG. 5B. FIG. 5A is a block diagram showing a portion of a configuration of the audio conference device 200A1. FIG. 5B is a block diagram of an adaptive filter 210A.

The audio conference device 200A1 according to the second preferred embodiment is different from the audio conference device 200A according to the first preferred embodiment in that the audio conference device 200A1 obtains the frequency characteristics 901A of the transmission system by obtaining a coefficient of the adaptive filter 210A. A description of overlapped configurations will be omitted.

As shown in FIG. 5A, the audio conference device 200A1 is provided with an adaptive filter 210A, a synthesizer 220A, and an echo reducer 100A1.

The adaptive filter 210A removes an echo during single talk. In other words, the adaptive filter 210A removes an echo of a reception signal that diffracts to a transmission signal when only the talker 900B on the side of the audio conference device 200B talks.

Specifically, the adaptive filter 210A obtains a reception signal that has been output from the echo reducer 100A1 and performs filter processing to the obtained reception signal. The adaptive filter 210A outputs the filter-processed signal as a pseudo echo signal, to the synthesizer 220A. The synthesizer 220A subtracts the pseudo echo signal from the transmission signal. The synthesizer 220A outputs the transmission signal from which the pseudo echo signal has been subtracted to the audio conference device 200B through the echo reducer 100A1 and the transmitter-receiver 130A. The adaptive filter 210A obtains a signal after being synthesized by the synthesizer 220A and updates a coefficient so that the level of the obtained signal may be set to zero.

Specifically, the adaptive filter 210A is provided with a plurality of taps 215A, an adder 214A, and an updater 212A, as shown in FIG. 5B. Although the block diagram shown in FIG. 5B shows four stages of taps 215A, the actual adaptive filter 210A is provided with the larger number of stages of taps 215A.

Each of the taps 215A is provided with an adjuster 216A and a delayer 218A. The delayer 218A delays the reception signal that has been input to the taps 215A only by a predetermined time (several tens of microseconds, for example) for one sample. In the delayers 218A of the taps 215A after the second stage, the delayer 218A on the preceding stage inputs a reception signal to the delayer 218A on the subsequent stage, the reception signal being delayed by the delayer 218A on the preceding stage. Each of the delayers 218A inputs the reception signal that has been delayed by each of the delayers 218A, to the corresponding adjuster 216A. The adjuster 216A adjusts the level of the reception signal that has been input with a predetermined gain. The adjuster 216A outputs the signal (an output signal of the tap 215A) of which the level has been adjusted. The gain of each of the adjusters 216A corresponds to the coefficient of the adaptive filter 210A.

The adder 214A adds the reception signal that has been output from each of the taps 215A, to the reception signal before being input to each of the taps 215A. The adder 214A outputs the added reception signal to the synthesizer 220A.

The updater 212A obtains the transmission signal that the synthesizer 220A outputs. The updater 212A updates the gain of each of the adjusters 216A so that the level of the obtained transmission signal may be set to zero.

Figure 6:
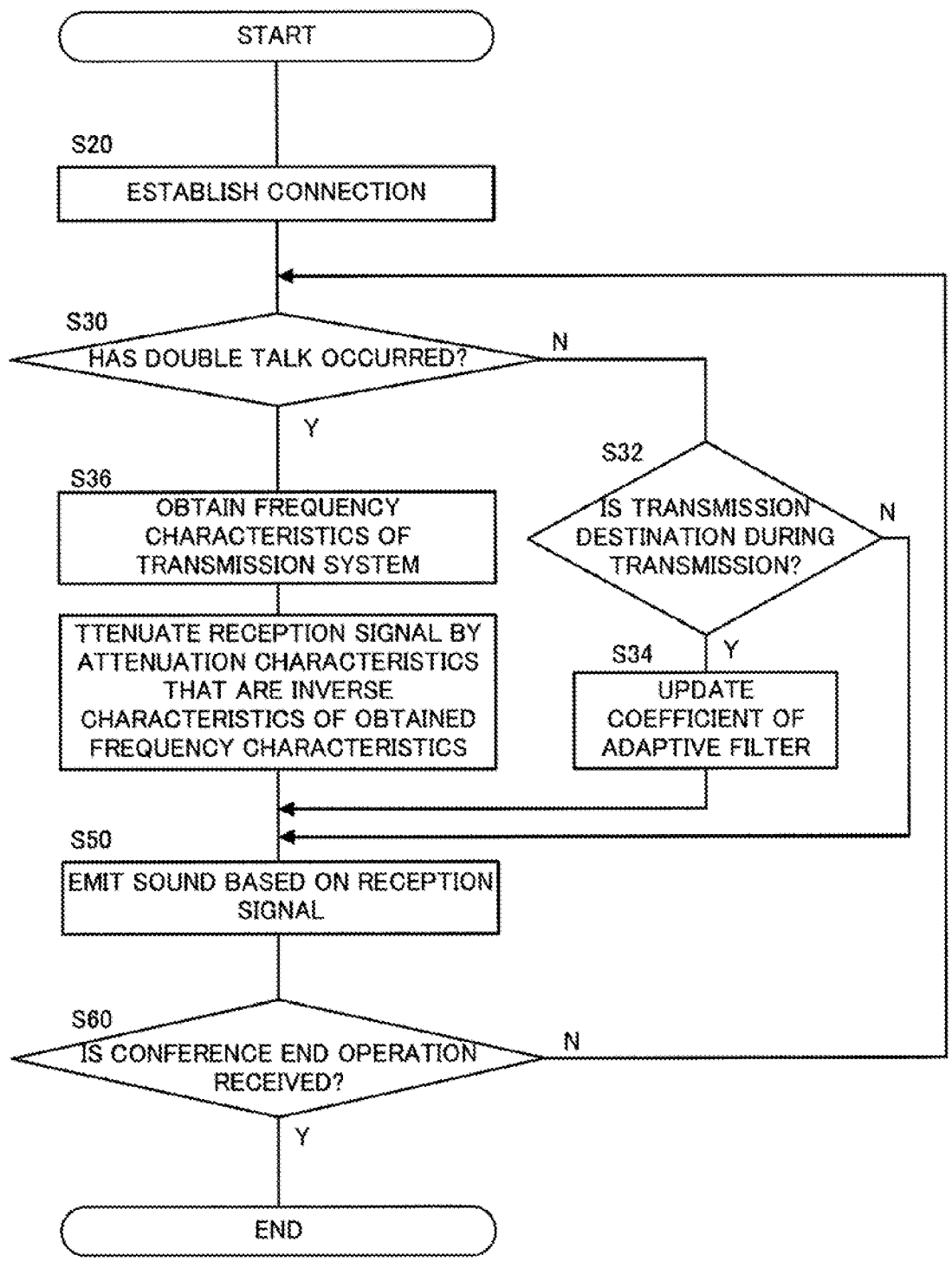
FIG. 6 is a flow chart showing an operation of the audio conference device according to the second preferred embodiment of the present invention.

The audio conference device 200A1 provided with the above-described configuration operates according to the flow chart shown in FIG. 6. However, the flow chart shown in FIG. 6 is different from the flow chart shown in FIG. 3 in that Step S32, Step S34, and Step S36 are provided. In addition, the flow chart shown in FIG. 6 is different from the flow chart shown in FIG. 3 in that Step S10 is not provided. A description of overlapped steps will be omitted.

When the determiner 3A determines that double talk has not occurred (S30: N), the updater 212A determines whether or not a transmission destination (the audio conference device 200B) is during transmission (S32). Specifically, the updater 212A obtains a reception signal, and determines that the transmission destination is during transmission (S32: Y) if the level of the obtained reception signal is greater than or equal to a predetermined threshold value (54 dB). However, the updater 212A may determine whether or not the transmission destination is during transmission by using a determination result of the determiner 3A of the echo reducer 100A1. The updater 212A, when determining that the transmission destination is during transmission (S32: Y), updates the coefficient of the adaptive filter 210A (S34). Then, the audio conference device 200A1 proceeds to Step S50.

The updater 212A, in a case in which the transmission destination is not during transmission (S32: N), does not update the coefficient of the adaptive filter 210A and proceeds to Step S50.

When double talk is determined to have occurred (S30: Y), the obtainer 5A1 obtains a filter coefficient from the adaptive filter 210A (S36). The obtainer 5A1 calculates frequency characteristics based on the obtained filter coefficient by using conventional technology such as a Fourier transformation. The calculated frequency characteristics correspond to the frequency characteristics 901A of the transmission system.

As described above, the audio conference device 200A1 according to the second preferred embodiment is able to obtain the frequency characteristics 901A of the transmission system without measuring, by using white noise or the like.

In addition, the audio conference device 200A1 according to the second preferred embodiment, since updating the adaptive filter 210A only during single talk when only the talker 900B talks, is able to prevent the adaptive filter 210A from not being appropriately updated by the voice of the talker 900A.

Figure 7:
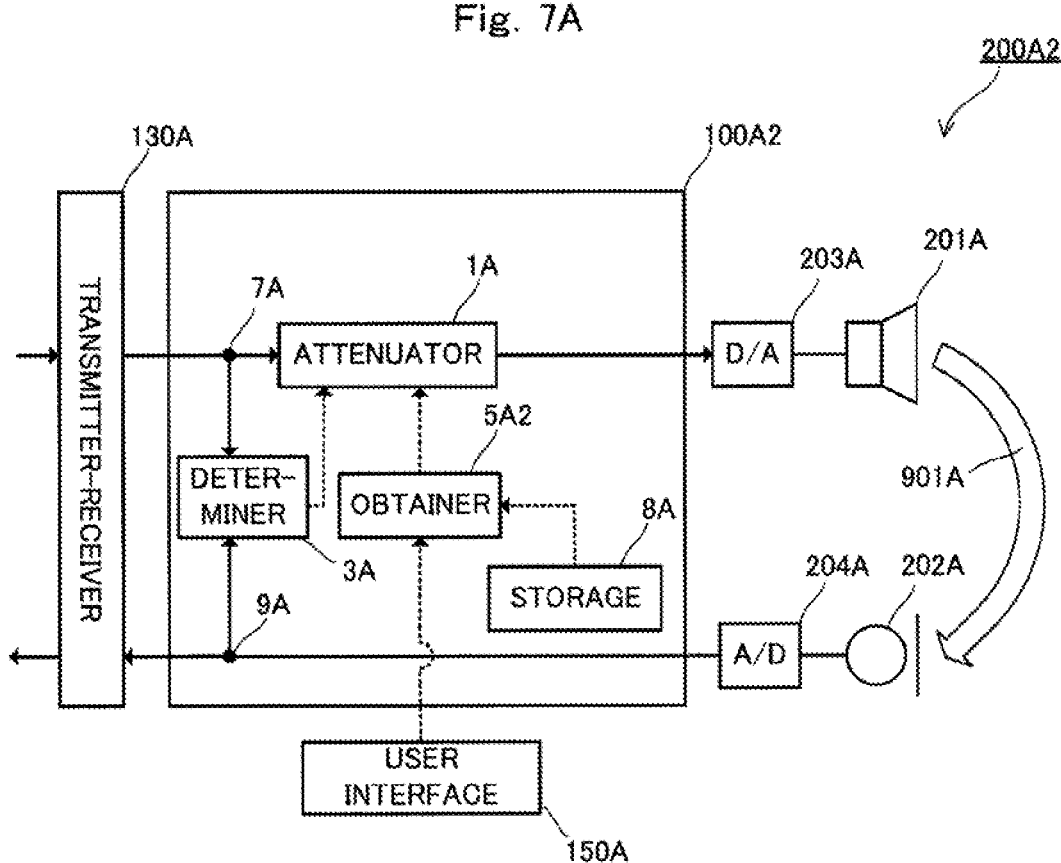
FIG. 7A is a block diagram showing a portion of a configuration of an audio conference device according to a third preferred embodiment of the present invention.
FIG. 7B is a diagram showing a size of conference rooms, and frequency characteristics of a transmission system in each of the conference rooms.

Subsequently, a description will be made of an audio conference device 200A2 according to a third preferred embodiment of the present invention with reference to FIG. 7A. FIG. 7A is a block diagram showing a portion of a configuration of the audio conference device 200A2. The audio conference device 200A2 obtains the frequency characteristics 901A of the transmission system by receiving a setting operation.

Specifically, as shown in FIG. 7A, the user interface 150A inputs the information of the operation received by the user interface 150A, to the obtainer 5A2. The user interface 150A, for example, receives an operation of specifying a level value of every 100 Hz. However, the user interface 150A may receive the following selection operation.

FIG. 7B is a diagram showing a size of conference rooms, and the frequency characteristics of the transmission system in each of the conference rooms. For example, a large conference room corresponds to frequency characteristics that show that a low-pitched sound (200 Hz or higher and lower than 500 Hz) is likely to become an echo. In other words, the low-pitched sound (200 Hz or higher and lower than 500 Hz), since being more easily diffracted from the speaker 201A to the microphone 202A compared with a high-pitched sound, is likely to become an echo during double talk. As shown in FIG. 7A, a storage 8A stores the corresponding information. The talker 900A performs an operation of selecting a size of a conference room, to the user interface 150A. The obtainer 5A2 obtains frequency characteristics corresponding to the selected conference room by reading the frequency characteristics from the storage 8A.

However, the user interface 150A may receive not only the operation of selecting a size of a conference room (installation space) but also a shape of a conference room, a distance between the microphone 202A and a wall, the quality of materials of a wall and a ceiling. In such a case, the obtainer 5A2 obtains the frequency characteristics of the transmission system corresponding to the shape of a conference room, the distance between the microphone 202A and a wall, and the quality of the materials of a wall and a ceiling.

In addition, the echo reducer 100A2 may obtain the frequency characteristics 901A of the transmission system by reading fixed frequency characteristics from the storage 8A without receiving the setting operation.

Although the attenuation characteristics of the attenuator 1A are set to be inverse characteristics of the frequency characteristics 901A of the transmission system in the above example, the attenuation characteristics of the attenuator 1A may be anything that reduces the level of only the frequency that is likely to become an echo during double talk. For example, the attenuation characteristics of the attenuator 1A may be the characteristics of a high-pass filter that attenuates cutoff frequency fc (500 Hz, for example) or below and causes a digital audio signal of a band higher than the cutoff frequency fc to pass.

Figure 8:
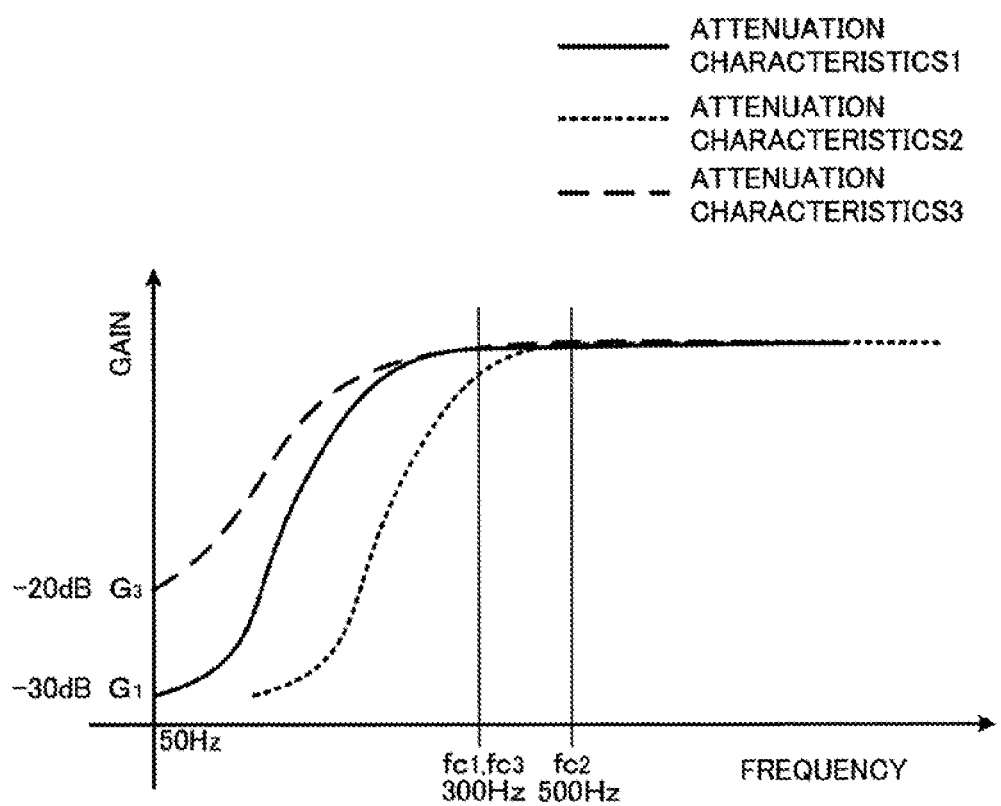
FIG. 8 shows an example of attenuation characteristics.

In addition, the attenuation characteristics of the attenuator 1A may be set up as follows. FIG. 8 shows an example of the attenuation characteristics. As shown in FIG. 8, the attenuation characteristics 1 to 3 are the characteristics of a high-pass filter. The cutoff frequency $fc_2$ (500 Hz, for example) of the attenuation characteristics 2 is higher than the cutoff frequency $fc_1$ and the cutoff frequency $fc_3$ (300 Hz, for example) of the attenuation characteristics 1 and the attenuation characteristics 3. The gain $G_3$ (−20 dB) of 50 Hz in the attenuation characteristics 3 has a smaller amount of attenuation than the gain $G_1$ (−30 dB) of 50 Hz in the attenuation characteristics 1.

The audio conference device 200A selects any one of the attenuation characteristics 1 to 3 according to the intensity of double talk, for example. Specifically, the attenuator 1A uses the attenuation characteristics 1 in a case in which the determiner 3A determines that each level of a transmission signal and a reception signal is greater than or equal to 54 dB. The attenuator 1A uses the attenuation characteristics 2 in a case in which the determiner 3A determines that each of the levels of a transmission signal and a reception signal is greater than or equal to 64 dB. As a result, compared with a case in which the attenuation characteristics 1 are used, the level below 500 Hz that is likely to become an echo during double talk becomes much smaller.

In addition, the attenuator 1A uses the attenuation characteristics 3 of which the amount of attenuation is small in a case in which the level of a transmission signal is greater than or equal to 54 dB and the level of a reception signal is greater than or equal to 44 dB and less than 54 dB. In other words, the attenuator 1A compares a transmission signal with a reception signal, and uses the attenuation characteristics 3 in a case in which the level of the transmission signal is larger than the level of the reception signal. As a result, the audio conference device 200A is able to more effectively prevent the voice of the talker 900B from becoming too small too much by reducing the amount of attenuation, when the echo during double talk does not become so large. As described above, the attenuator 1A may adjust the amount of attenuation and cutoff frequency according to the intensity of double talk.

Furthermore, the attenuator 1A may select any one of the attenuation characteristics 1 to 3 according to a measurement result of the measurer 6A, not according to the intensity of double talk. For example, the attenuator 1A, when the frequency characteristics 901A of the transmission system of which the peak is at 400 Hz is measured, uses the attenuation characteristics 2 of which the cutoff frequency fc is set to 500 Hz.

However, the attenuation characteristics of the attenuator 1A may be anything that reduces only an echo during double talk, and are not limited to the characteristics of a high-pass filter. Therefore, the attenuation characteristics according to a preferred embodiment of the present invention may be the characteristics of a peak filter, may be the characteristics of a low-pass filter, or may be the characteristics of a band-pass filter. In addition, the attenuation characteristics according to a preferred embodiment of the present invention may be a combination of characteristics of a plurality of filters.

It is to be noted that, in the above example, the determiner 3A has used the levels of the reception signal and the transmission signal in order to determine the occurrence of double talk. However, the determiner 3A may use various conventional technologies related to voice section detection in order to determine the occurrence of double talk. For example, the determiner 3A may determine that double talk has occurred when a plurality of zero cross points are detected with respect to amplitude at a predetermined level in both a reception signal and a transmission signal. Furthermore, the determiner according to a preferred embodiment of the present invention may determine the occurrence of double talk as follows.

Figure 9:
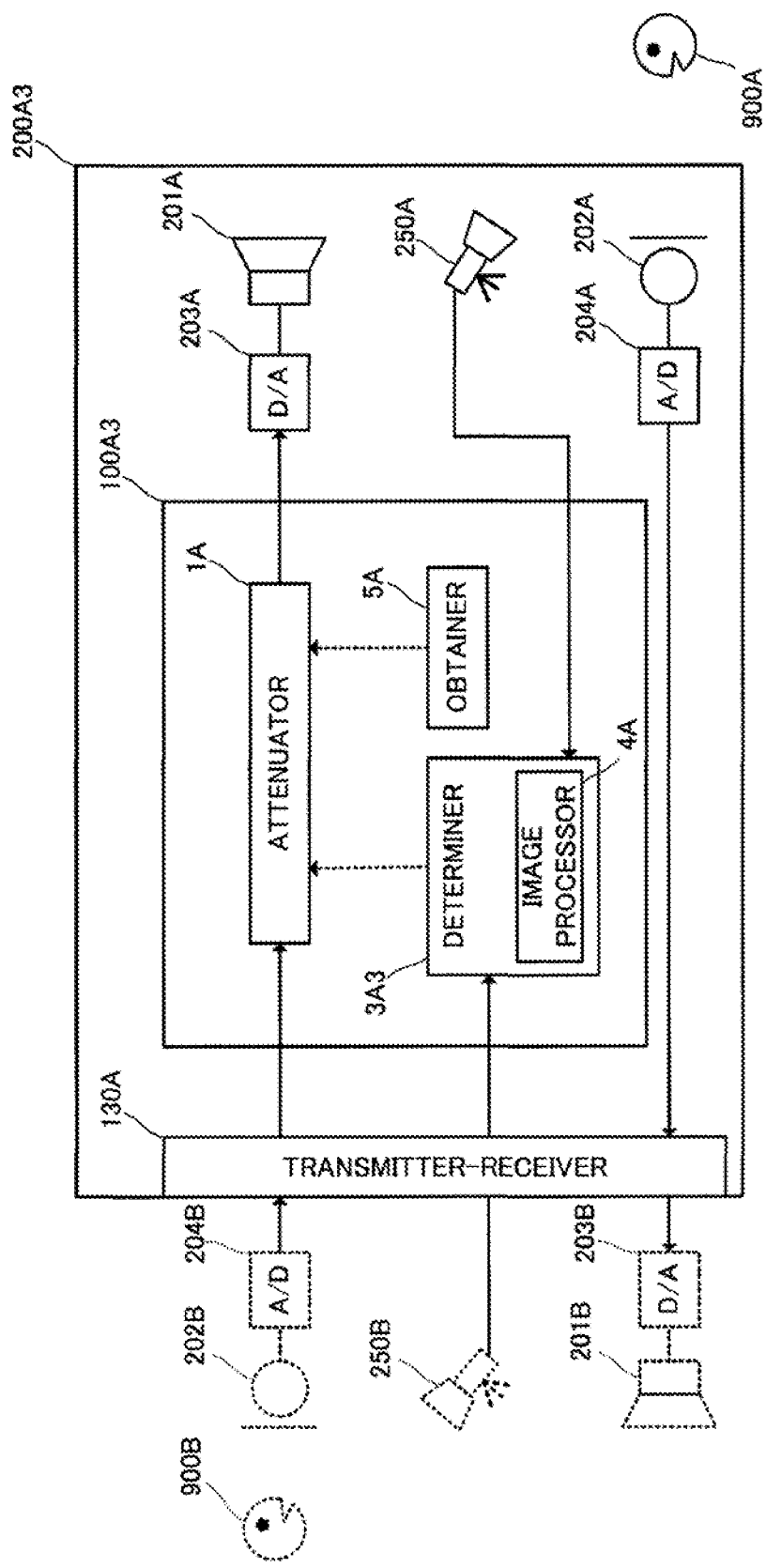
FIG. 9 is a block diagram showing a portion of a configuration of an audio conference device according to a fourth preferred embodiment of the present invention.

Subsequently, a description will be made of an audio conference device 200A3 and an audio conference device 200B3 according to a fourth preferred embodiment of the present invention with reference to FIG. 9. FIG. 9 is a block diagram showing a portion of a configuration of the audio conference device 200A3. Since the configuration of the audio conference device 200B3 is the same as the configuration of the audio conference device 200A3, a description of a portion of the configuration will be omitted.

In the fourth preferred embodiment, the audio conference device 200A3 determines double talk by detecting the motion of the lips of the talker 900B while the audio conference device 200B3 determines double talk by detecting the motion of the lips of the talker 900A. Specifically, as shown in FIG. 9, the audio conference device 200A3 is provided with a video camera 250A. The video camera 250A images the lips of the talker 900A. The video camera 250A outputs image information to the determiner 3A3.

The audio conference device 200B3 is provided with a video camera 250B. The video camera 250B images the lips of the talker 900B. The video camera 250B outputs image information to the determiner 3A3 of the audio conference device 200A3 through the network 900X. In other words, the determiner 3A3 obtains the image information of the lips of the talker 900A and the talker 900B.

The determiner 3A3 is provided with an image processor 4A. The image processor 4A analyzes the image information of the lips of the talker 900A and the talker 900B and thus performs motion body detection. The motion body detection is achieved by the various conventional technologies that use a differential image, for example. As a result, the determiner 3A3 determines whether or not the lips of the talker 900A and the talker 900B are in motion.

The determiner 3A3, when determining that the lips of both the talker 900A and the talker 900B are in motion, determines that double talk has occurred. However, the image processor 4A may perform motion body detection in a vicinity of not only the lips of the talker 900A and the talker 900B but also the microphone 202A and the microphone 202B. In other words, the determiner 3A3 may determine double talk by detecting that the talker 900A has approached the microphone 202A and that the talker 900B has approached the microphone 202B.

Furthermore, the determiner 3A3 may determine double talk by detecting not only an imaged image but also a motion body in a vicinity of the microphone 202A and the microphone 202B using infrared rays.

It is to be noted that the above-described audio conference system, although being provided with two sets of audio conference devices, may be provided with three or more sets of audio conference devices.

Finally, the foregoing preferred embodiments are illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. An echo reducer comprising:
an obtainer configured to obtain frequency characteristics of a voice transmission system from a sound emitter of a sound emission and collection device to a sound collector of the sound emission and collection device;
a determiner configured to determine whether or not both a transmission signal and a reception signal in the sound emission and collection device are in a state of including a sound; and
an attenuator configured to attenuate the reception signal to be output to the sound emitter by attenuation characteristics corresponding to inverse characteristics of the frequency characteristics of the voice transmission system that the obtainer obtains, when the determiner determines that both the transmission signal and the reception signal in the sound emission and collection device include a sound.

2. The echo reducer according to claim 1, wherein the state in which both the transmission signal and the reception signal in the sound emission and collection device include a sound includes double talk.

3. The echo reducer according to claim 2, wherein the obtainer comprises a measurer configured to measure the frequency characteristics of the voice transmission system.

4. The echo reducer according to claim 2, further comprising a receiver configured to receive an operation of setting of the frequency characteristics of the voice transmission system, wherein the obtainer obtains the frequency characteristics of the voice transmission system that the receiver has received.

5. The echo reducer according to claim 4, wherein:
the receiver receives an operation of selecting any one of a plurality of predetermined values according to the frequency characteristics of the voice transmission system; and
the plurality of predetermined values correspond to a size of an installation space of the sound emission and collection device.

6. The echo reducer according to claim 1, wherein:
the sound emission and collection device comprises an adaptive filter; and
the obtainer obtains the frequency characteristics of the voice transmission system based on a coefficient of the adaptive filter.

7. The echo reducer according to claim 1, wherein:
the determiner determines whether or not both the transmission signal and the reception signal in the sound emission and collection device are in the state of including a sound by comparing a level of the reception signal and a level of the transmission signal to be output from the sound collector; and
the attenuator changes the attenuation characteristics based on a comparison result.

8. The echo reducer according to claim 1, wherein the attenuator attenuates the reception signal to be output to the sound emitter, in a frequency band that corresponds to a peak of the frequency characteristics.

9. The echo reducer according to claim 1, wherein the frequency characteristics provide that an amount of attenuation increases as frequency decreases.

10. A voice communication device comprising:
the echo reducer according to claim 1; and
the sound emission and collection device, wherein the sound emission and collection device comprises a transmitter-receiver configured to transmit and receive the reception signal and the transmission signal with another sound emission and collection device.

11. An echo reducer comprising:
an obtainer configured to be input with information of frequency characteristics of a voice transmission system from a sound emitter of a sound emission and collection device to a sound collector of the sound emission and collection device;

a determiner configured to be input with a reception signal to be received from a different sound emission and collection device and a transmission signal to be transmitted to the different sound emission and collection device and configured to output information of an occurrence of a state in which both the transmission signal and the reception signal in the sound emission and collection device include a sound; and an attenuator configured to be input with the reception signal, the information of the occurrence of the state in which both the transmission signal and the reception signal in the sound emission and collection device include a sound, the information being output by the determiner, and the information of frequency characteristics of the voice transmission system that the obtainer outputs, and configured to output the reception signal that has been attenuated by attenuation characteristics corresponding to inverse characteristics of the frequency characteristics of the voice transmission system, to the sound emitter.

12. A method for reducing an echo, the method being implemented by a computer and comprising:

obtaining frequency characteristics of a voice transmission system from a sound emitter of a sound emission and collection device to a sound collector of the sound emission and collection device;

determining an occurrence of a state in which both a transmission signal and a reception signal in the sound emission and collection device include a sound; and attenuating the reception signal to be output, by attenuation characteristics corresponding to inverse characteristics of obtained frequency characteristics of the voice transmission system, when the occurrence of the state in which both the transmission signal and the reception signal in the sound emission and collection device include a sound is determined.

13. The method for reducing an echo according to claim 12, wherein the state in which both the transmission signal and the reception signal include a sound includes double talk.

14. The method for reducing an echo according to claim 13, further comprising measuring the frequency characteristics of the voice transmission system.

15. The method for reducing an echo according to claim 13, further comprising:

receiving an operation of setting of the frequency characteristics of the voice transmission system; and obtaining received frequency characteristics of the voice transmission system.

16. The method for reducing an echo according to claim 15, further comprising receiving an operation of selecting any of a plurality of predetermined values according to the frequency characteristics of the voice transmission system, wherein the plurality of predetermined values correspond to a size of an installation space of the sound emission and collection device.

17. The method for reducing an echo according to claim 12, wherein:

the sound emission and collection device comprises an adaptive filter; and the frequency characteristics of the voice transmission system is obtained based on a coefficient of the adaptive filter.

18. The method for reducing an echo according to claim 12, further comprising:

determining whether or not both the transmission signal and the reception signal in the sound emission and collection device include a sound by comparing a level of the reception signal and a level of the transmission signal to be output from the sound collector; and changing the attenuation characteristics based on a comparison result.

19. An echo canceller comprising:

one or more processors; and one or more memories having program instructions stored thereon that are executable by the one or more processors to cause the echo canceller to:

obtain frequency characteristics of a voice transmission system from a sound emitter of a sound emission and collection device to a sound collector of the sound emission and collection device;

determine an occurrence of a state in which both a transmission signal and a reception signal in the sound emission and collection device include a sound; and attenuate the reception signal to be output, by attenuation characteristics corresponding to inverse characteristics of obtained frequency characteristics of the voice transmission system, when the occurrence of the state in which both the transmission signal and the reception signal in the sound emission and collection device include a sound is determined.

* * * * *